July 10, 1951  
J. B. ELLIOTT  
2,560,422  
TRANSPORT DEVICE FOR LAWN MOWERS  
Filed Feb. 16, 1948  
2 Sheets-Sheet 1

Joseph B. Elliott  
INVENTOR.

July 10, 1951  J. B. ELLIOTT  2,560,422
TRANSPORT DEVICE FOR LAWN MOWERS
Filed Feb. 16, 1948  2 Sheets-Sheet 2
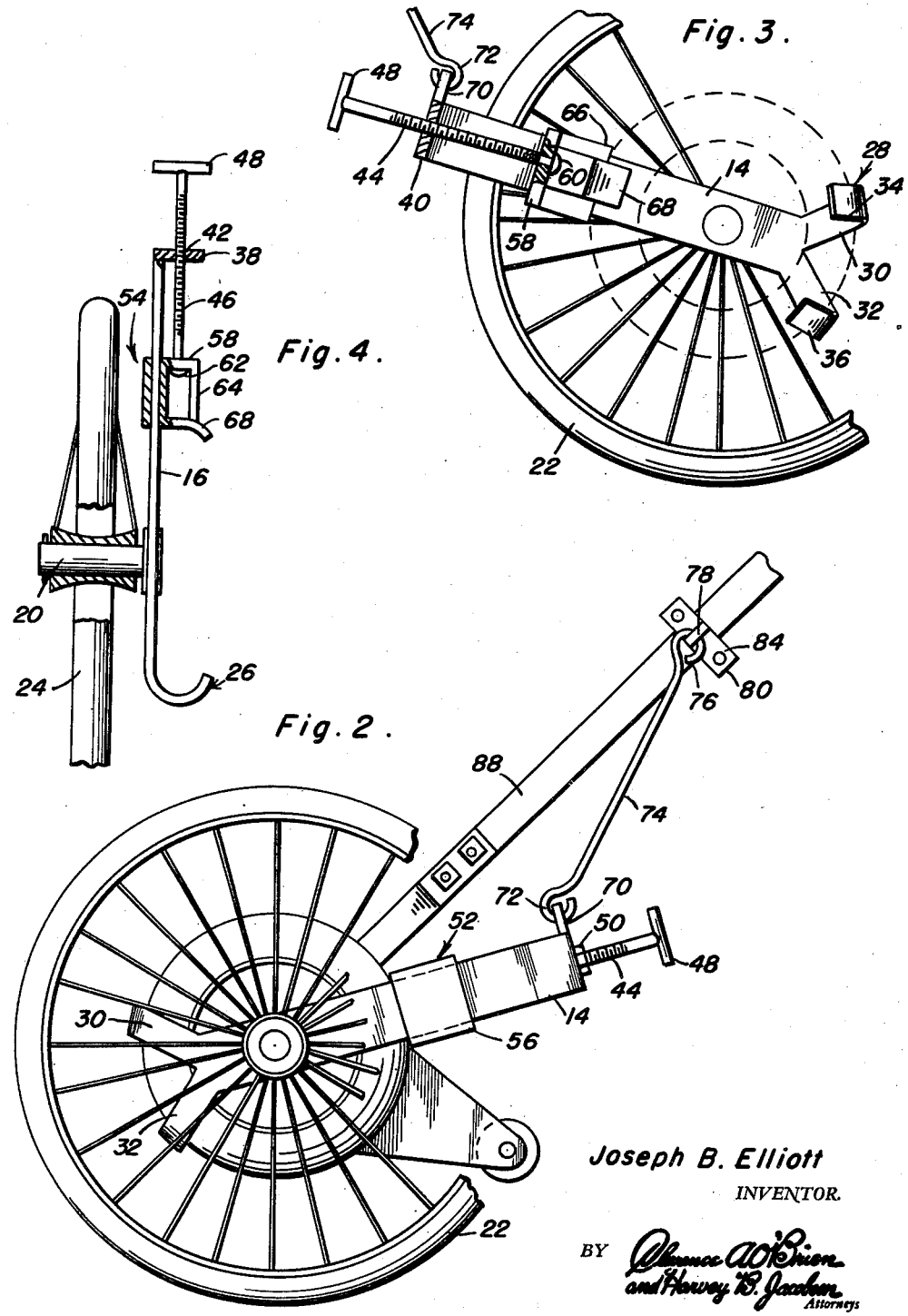
Joseph B. Elliott
INVENTOR.

Patented July 10, 1951

2,560,422

UNITED STATES PATENT OFFICE 2,560,422

TRANSPORT DEVICE FOR LAWN MOWERS

Joseph B. Elliott, Longview, Tex.

Application February 16, 1948, Serial No. 8,594

3 Claims. (Cl. 280—61)

This invention relates to a transport truck, adapted to support and move in such supported position a lawn mower and has for its primary object to enable a lawn mower to be easily and conveniently transported in an inoperative placement.

Another object of this invention is to provide means, whereby a lawn mower may be transported from one operating or cutting locale to another, in an inoperative position, so that the cutter blades and actuating assembly of the lawn mower is protected against injury and damage.

Another object of this invention is to provide means for moving a lawn mower, whereby the upper frame assembly of the lawn mower may be utilized in such transportation, while the lower working assembly is supported in spaced inoperative relation to the ground.

Another object of this invention is to provide means for supporting a lawn mower, regardless of the make or type of the lawn mower and to provide means for locking a lawn mower in said transporting means.

Another object of this invention to be specifically herein enumerated resides in the provision of a lawn mower transporting truck, which is economical and inexpensive to manufacture, durable and reliable in employment and adjustable, relative to the various makes and types of lawn mowers.

A meritorious feature of this invention resides in the provision of a pair of cradle supports, for accommodating the wheels of a lawn mower and in the provision of locking means associated with said cradle supports, whereby the wheels may be locked in said supported and transported position.

Another important feature of this invention resides in the provision of a pair of rigidifying rods in association with said support bars, whereby the upper frame of the lawn mower may be supported relative to the lower frame and the handle section of the lawn mower may be utilized as the medium for transmitting power to the transport truck.

These and ancillary objects and other meritorious features are attained by this invention, a preferred embodiment of which is set forth in the following description and illustrated in the accompanying drawings, wherein:

Figure 2 is a side elevational view of this invention with a portion of the wheel broken away to exemplify the means provided to lock the wheels of the lawn mower in transporting placement and to brace the upper frame of the lawn mower relative to the secured lower assembly thereof;

Figure 3 is a perspective view of this invention, showing a portion of the adjusting or locking means in sections, and, Figure 4 is an enlarged structural view, showing parts in section and the support bars in elevation.

Figure 1:
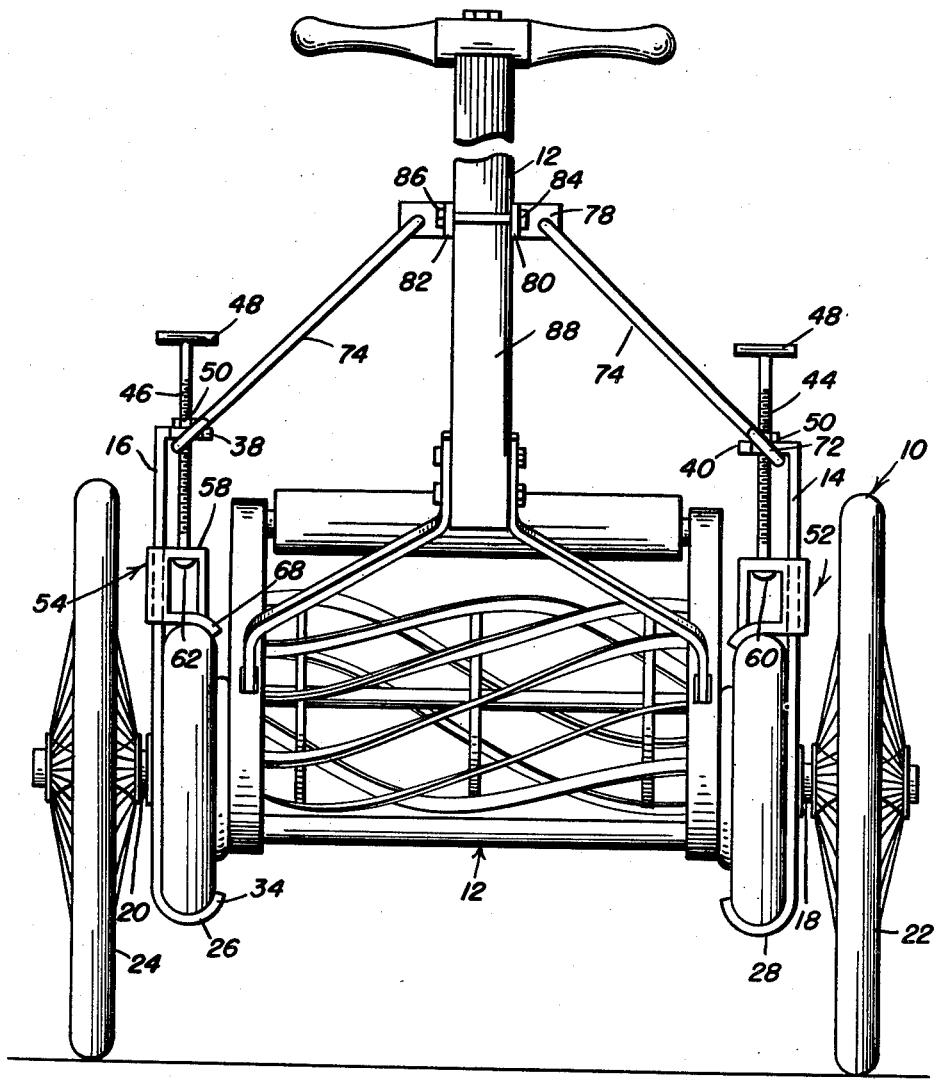
Fig. 1 is a front elevational view of a transport truck, constructed according to the principles of this invention, showing a conventional lawn mower supported in transporting placement thereon.

Referring now more particularly to the drawings, wherein similar characters of reference designate corresponding parts throughout, there is shown a transport truck, generally denoted by the character reference 10, which is adapted to securely support and transport a conventional lawn mower, 12, shown in attachment therein, with reference to Figure 1.

The transport truck 10 comprises a pair of support bars 14 and 16, which are suitably secured adjacent their lower extremity to a pair of stub axles 18 and 20, having a pair of wheels 22 and 24 rotatably supported thereon.

Disposed at the lower extremity of the support bars 16 and 14 are a pair of V-shaped cradles, 26 and 28, which comprise a pair of angularly extending branches or arms 30 and 32, which are arcuately upturned, as at 34 and 36.

Laterally extending and projecting inwardly from the support bars 14 and 16 are angular termini 38 and 40, which are suitably centrally threadedly bored, as at 42. Inserted through the apertured offset extremities 38 and 40 are a pair of threaded rods 46 and 44, having handle elements 48 secured thereon. A conventional nut 50 disposed on the threaded shank of the rods 46 and 44 and seated on the lateral extremities 38 and 40 of the support bars maintains the rods in selected positions in the apertures 42.

Slidably supported on the support bars 14 and 16 and complementary to the V-shaped cradles 26 and 28 on the lower extremities thereof are a pair of adjustable clamp members 52 and 54. The adjustable or movable clamps 52 and 54 comprise a rectangular sleeve 56 having an apertured lateral arm 58 extending inwardly therefrom, the lower peened or disced ends 60 and 62 of the actuating rods 44 and 46, being suitably secured to the undersurface thereof, with the terminating portion of the shank of the rods being suitably received or inserted through the aperture therein. Depending from the laterally extending arm 58 at the extremity thereof are a pair of depending oppositely disposed arms 64 and 66, in the inner space of which there is supported an extended semi-arcuate arm 68.

Projecting integrally from the apertured lateral arms 38 and 40 are perforated offset plates 70, within which is received the eye or hook extremity 72 of a rigidifying or brace rod 74, the opposite eye or hook extremity 76 of the rod 74 being suitably received within an apertured ear 78 of clamping plates 80 and 82, the opposed extremities of the clamping plates 80 and 82 being suitably apertured. Conventional bolts and nuts 84 and 86 are provided, in association with the apertures in the plates 80 and 82 to secure the plates on the extending bar 88 of the lawn mower 12.

Thus, it can be seen that the lawn mower 12 may be suitably supported and transported in the truck 10, with the wheels of the lawn mower seated in the V-shaped cradles 26 and 28 and suitably locked or secured in said placement by means of the adjustable and movable semi-arcuate clamp plates 68, which are moved in and out of clamping engagement relative to the lower cradle sections by means of the actuating rods 44 and 46, which control the sliding movement of the clamp blocks 52 and 54 on the support bars 14 and 16, through the rotation of the handle grips 48 and the consequent movement of the rods.

The upper frame of the lawn mower is rigidified or braced relative to the lower operating assembly, through the medium of the rigidifying rods 74, which support the handle frame 88 in secured position relative to the wheels 22 and 24 of the transporting truck 10, so that the handle assembly 88 of the lawn mower may be utilized to move the lawn mower truck and the secured lawn mower from various operating or cutting locales.

Thus, it can be seen that there is provided an efficient and convenient means, whereby with a minimum expenditure of labor and in a minimum of time consumed a lawn mower may be positioned in a transporting truck and conveniently moved from various cutting areas.

It is to be particularly apparent that a device such as this is especially useful, when employed in association with the upkeep and conditioning of a golf course, so that when a lawn mower is employed to trim the grass, surrounding the various holes, the mower may be conveniently moved from hole to hole, in an inoperative position, so that the fairway will not be trimmed and so that damage or injury to the cutting blades will be obviated.

Since many other objects and modifications of this invention will become apparent to those skilled in the art, upon a perusal of the foregoing description, in association with the accompanying drawings, it is to be understood that certain changes may be effected thereon, within the spirit of the invention and within the scope of the appending claims.

Having described the invention, what is claimed as new is:

1. A truck for transporting a lawn mower comprising a pair of wheels, an axle for each of said wheels, a bar vertically mounted on each of said axles, each of said bars having an upper and lower end, a cradle support formed on the lower end of each of said bars for supporting a wheel of the lawn mower, a lateral apertured ear on the upper end of each of said bars, a clamp slidably mounted on each of said bars for locking a wheel of said mower in each of the cradle supports, an actuating screw carried by each of the ears and connected to said clamp, a link carried by each of the ears and complementary clamping means on each of said links for attaching the links to the frame of the lawn mower.

2. A truck for transporting a lawn mower comprising a pair of wheels, an axle for each of said wheels, a vertical bar on each of said axles and each of said bars having an upper and lower end, a cradle support formed on the lower end of each of said bars for supporting a corresponding wheel of the lawn mower, a lateral apertured ear on the upper end of each of said bars, each of said ears overlying a corresponding cradle support, a clamp slidably mounted on each of said bars for locking the wheel of said mower in each of the cradle supports, an actuating screw carried by each of said ears and connected to said clamp, a link carried by each of the ears, a split clamp on the upper end of each of said links for securing the links to the frame of the lawn mower whereby the lawn mower frame may function as a handle for the truck.

3. In a transporting truck for a lawn mower, a wheel, an axle for said wheel, a bar vertically mounted on the axle, a cradle formed on the lower end of the bar, a sleeve slidably disposed on the bar, a lateral flange on said sleeve formed complementary to the cradle to clamp a wheel of the lawn mower therein, a lateral ear on the upper end of the bar, an actuating screw carried by the ear and connected to the sleeve for moving the sleeve on the bar, a link carried by the ear and clamping means on said link for attachment to the upper frame of the lawn mower.

JOSEPH B. ELLIOTT.

REFERENCES CITED

The following references are of record in the file of this patent:

UNITED STATES PATENTS

| Number | Name | Date |
| --- | --- | --- |
| 1,433,018 | McMillin | Oct. 24, 1922 |
| 1,543,626 | Stansbury | June 23, 1925 |
| 1,640,297 | Rogers | Aug. 23, 1927 |
| 1,731,204 | Recchia | Oct. 8, 1929 |
| 2,058,691 | Holsten et al. | Oct. 27, 1936 |
| 2,236,135 | Good | Mar. 25, 1941 |